A. Wyckoff,
Hollow Auger.

N° 24,773. Patented July 12, 1859.

Witnesses:
A. B. Galatian
A. G. Reynolds

Inventor:
Arcalous Wyckoff.

UNITED STATES PATENT OFFICE.

ARCALOUS WYCKOFF, OF ELMIRA, NEW YORK.

HOLLOW AUGER.

Specification of Letters Patent No. 24,773, dated July 12, 1859.

*To all whom it may concern:*

Be it known that I, ARCALOUS WYCKOFF, of Elmira, in the county of Chemung and State of New York, have invented certain new and useful Improvements in the Method of Constructing Annular Augers; and I do hereby declare that the following is a full and exact description thereof, reference being had to the accompanying drawings, in which—

Figure 3:
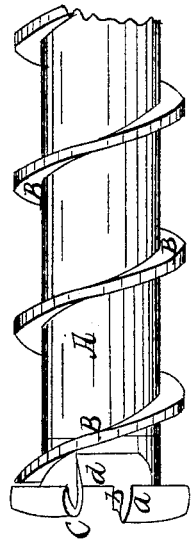
Figure 1:
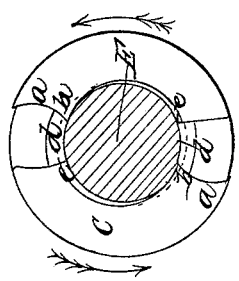
Figure 2:
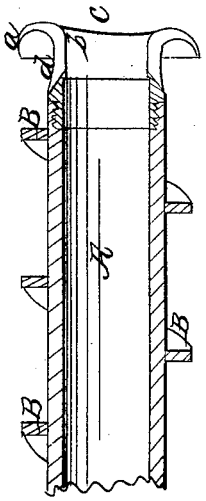

Figure 1 is an end elevation; Fig. 2 a longitudinal section of the cutting end, and Fig. 3 a side elevation of the same.

Similar letters refer to corresponding parts in all of the figures.

My invention relates to the cutting portion of those tubular augers which in boring remove only a portion of the wood leaving a core or rod in the center. Their construction is well known to consist of a metallic tube A, with a flat piece of metal or worm, B, wound spirally around the same, the cutting portion consisting of an annular head, C, attached to the end. As these augers are chiefly used for boring long pieces of timber for pump tubing, &c., and are driven by machinery, it is highly important that the cutter heads should be so formed as not only to cut with rapidity, but be capable of being guided in its direction with accuracy so as not to diverge from the center of the stick and not to choke or become obstructed by the chips which are made. To these objections they are peculiarly liable, and especially to the latter, from the limited space left without the tube for the discharge of the chips. My invention has the overcoming of these difficulties for its object.

I construct the cutter head with the cutting lips or edges, $a$ $a$, which start at the periphery or exterior portion of the bit, and extend toward the center in a concave line till they terminate in the interior portion of the tube or aperture at $b$, where their direction approaches a line longitudinally with the auger, though if oblique or curved it answers equally well. I do not make the aperture for the core, E, through the cutter a perfect circle, but somewhat elliptical (as seen in Fig. 1, the dotted line indicating the true circle) and the cutting edges, $b$ $b$, are on the opposite side of the short diameters of the opening. I combine with each of these cutting edges a transverse cutter, $d$; their sharp edges forming the inner lines of the short axis of the ellipse. At the termination of these cutters or spurs the opening enlarges suddenly, $e$ $e$, to the diameter of the true circle, and immediately back of them the throat is enlarged to the size of the interior of the tube A. The cutters $a$ $a$ remove the main portion of the wood from the periphery of the bore to the exterior surface of the core E, which is dressed by the inner edges $b$ $b$. The direction of their cutting is necessarily transverse to the fibers of the wood, and consequently the core is left rough with the torn and disintegrated fibers. These intrude between the core and the inner surface of the cutter-head, obstructing the operation of the cutting edges, and causing great friction, both interfering with the free operation of the auger, and causing it to choke. Their presence on the surface of the core when finished unfits it by its roughness of surface, for many useful purposes to which it would otherwise be adapted. But the auxiliary transverse cutters, $d$ $d$, following the main cutters $a$ $a$, cut in the direction of the fibers, clearing them off like little planes, their sharp edges shaving closely the surface as the timber is fed to the auger, and from its rapid revolution clearing every part till the core is rendered perfectly smooth and polished. The enlargement of the throat immediately following these, as well as in other parts of the cutting head by the elliptical form of the opening, prevents the fibers from accumulating, or becoming wedged in; and, with the cutting parts kept free from obstruction, and the rod, or core, made smooth, the boring is more rapid, the auger more perfectly guided, and more easily kept in order.

What I claim as my invention and desire to secure by Letters Patent is—

Combining the transverse auxiliary cutters $d$ $d$ with the prime cutters $a$ $a$ and elliptic opening of the annular cutter-head, as described, substantially as, and for the purposes herein set forth.

ARCALOUS WYCKOFF.

Witnesses:
A. B. GALATIAN,
A. G. REYNOLDS.